United States Patent
Lanari

[11] Patent Number: 5,134,045
[45] Date of Patent: Jul. 28, 1992

[54] MULTITUBULAR BAG FOR ELECTRODES OF ELECTRIC BATTERIES

[75] Inventor: Giuseppe Lanari, Milan, Italy
[73] Assignee: Mecondor S.p.A., Milan, Italy
[21] Appl. No.: 699,078
[22] Filed: May 13, 1991
[30] Foreign Application Priority Data
   Nov. 9, 1990 [JP] Japan ............... 22004 A/90
[51] Int. Cl.⁵ ............... H01M 2/18; H01M 4/76
[52] U.S. Cl. ............... 429/141; 429/238
[58] Field of Search ............... 429/140, 141, 238
[56] References Cited
U.S. PATENT DOCUMENTS

| | | | |
|---|---|---|---|
| 2,266,546 | 12/1941 | Galloway | 429/140 |
| 2,350,752 | 6/1944 | Graf | 429/140 |
| 2,972,000 | 2/1961 | Briolo | 429/140 |
| 2,981,283 | 4/1961 | Bushrod | 429/140 |
| 3,224,905 | 12/1965 | Hentschec | 429/141 |

*Primary Examiner*—Stephen Kalafut
*Attorney, Agent, or Firm*—Browdy and Neimark

[57] ABSTRACT

A multitubular bag for electrodes of electric batteries, made of a one-piece double fabric (1a) establishing a plurality of parallel pipes (3) in its inside, the double fabric (1a) of bag (1) showing transversal high tenacity and high tensile strength multifilament yarns (4) laid in a direction transversal to the main development direction of pipes (2), and longitudinal high porosity yarns (5) obtained starting from synthetic fiber staple laid in longitudinal direction, that is laid in a direction parallel to the main developement direction of pipes (2).

4 Claims, 2 Drawing Sheets

5,134,045

MULTITUBULAR BAG FOR ELECTRODES OF ELECTRIC BATTERIES

BACKGROUND OF THE INVENTION

The invention refers to a multitubular bag for electrodes of electric batteries, made of synthetic fabric and foreseen for holding active material of positive plates of electric lead-acid batteries.

It is known that the duration of electric lead batteries is directly related to the removal of active material from the positive plate and to the corrosion of the conducting support, made of lead alloy, of the same positive plate. Both of these effects are caused by mechanical stresses that are related to volume changes of the active material, with the surcharging of elements and vibrations to which the battery is sometimes subjected.

For avoiding rapid depletion of electric batteries the indicated drawbacks have been limited by developing tubular positive plates, in which the conductive support made of lead alloy, a pin, is housed in the center of the active material with a limited surface exposed to anodic corrosion and with the active material kept pressed and compacted around the pin by means of pipes made of porous material which is resistant to acids.

These pipes are made in the form of multitubular bags, which at the end of the machinings have dimensions and pipe number related to the characteristics of the tubular positive plates to be obtained.

Further it is known that the plate capacity is related to the quantity of active material and the possibility for this active material being contacted from the acid at the required surface, while any phenomenon that can slow down or reduce the diffusion of the acid causes, as a result, a higher voltage drop, therefore a negative effect on the high efficiency of the same electric battery. These voltage drops are more detrimental in the case of drive type electric batteries where the discharges have a high intensity (that is a discharge occurs each 24 hours). The stationary electric batteries have mainly a slow discharge, although in certain applications there are also foreseen short discharges with high intensity in electric batteries of this type.

Therefore the above mentioned pipes that keep the active material pressed and compacted around the pins must have precise mechanical and chemical characteristics. From a mechanical point of view the pipes must have the following characteristcs:

a very high porosity and preferably similar to a microporous structure for holding better the active material, in particular when this is made of extremely thin powder;

a good elasticity, keeping in mind that the activematerial in the inside of pipes suffers volume variations under the effect of chemical transformations to which it is submitted;

a good resistance to abrasion, this last being a consequence of vibrations to which the drive type electric batteries are subjected during the service;

a good mechanical resistance constant versus time for guaranteeing the compactness of the positive active material and its coherence with the conductive lead core inserted in the center of the same pipe.

From the chemical point of view the required characteristics are the following ones:

a high resistance to oxidation, that for drive electric batteries must be particularly high, these electric batteries being submitted to continuous cycles of charging and discharging with severe runnings during which nascent oxygen is generated on the positive plate;

minimum pollution of the electrolyte caused by products of breakdown of polymeric molecules, in particular with respect to chlorine or perchlorate ions.

Different embodiments of these pipes and related multitublar bags are known, e.g. there are known pipes made of real fabric, in particular of fabric based on polyester fibers, or pipes made of "non-woven" fabric, that is of felt, usually still made of polyester.

The pipes made of real fabric based on polyester fibers have a good porosity and excellent mechanical characteristics, good elasticity, do not release polluting materials and have a sufficient resistance to oxidation. They are widely used in the sector of multitubular bags made of polyester fibers in continuous high tenacity filament with excellent mechanical characteristics.

Yet the porosity is supplied by openings that are obtained in the weaving process with the free spaces between yarns, and the high tenacity polyester, being usually coated with resins, has a very smooth surface which can cause difficulties in holding very thin powders.

The pipes of "non-woven" fabric made of felt, usually made of polyester, have naturally an excellent porosity, but have limitations owing to the poor mechanical strength of felt and lack of elasticity.

Further owing to the number of charging and discharging cycles of the electric battery, it is noticed a continuous relaxation of the same pipes and therefore a consequent loss of compression and coherence of the active material and above all of the coherence of the same active material with the conductive pin made of lead alloy.

SUMMARY OF THE INVENTION

An aim of the invention is to provide multitubular bags that have excellent mechanical characteristics and a very high porosity and that are suitable for keeping constant the compression of the active material on the pin during the volume changes of the same active material.

Another important aim of the invention is to provide multitubular bags suitable for being easily made with different degrees of porosity, optimal for active materials in powders of various granulometry and which can be also made starting from a sole initial structure.

These and other objects are obtained from a multitubular bag for electrodes of electric batteries, having a plurality of pipes parallel with one another and having a main development direction, comprising a one-piece double fabric forming said pipes in its inside, and including transversal yarns of multifilament type having high tenacity and high tensile strength, laid in direction transversal to said main development direction, and longitudinal yarns of high porosity type obtained starting from synthetic fiber staple, laid in direciton parallel to said main development direction.

BRIEF DESCRIPTION OF THE DRAWINGS

Now there are referred the detailed descriptions of preferred embodiments of the invention, supplied with reference to annexed drawings, in which.

DETAILED DESCRIPTION OF THE INVENTION

Figure 1:
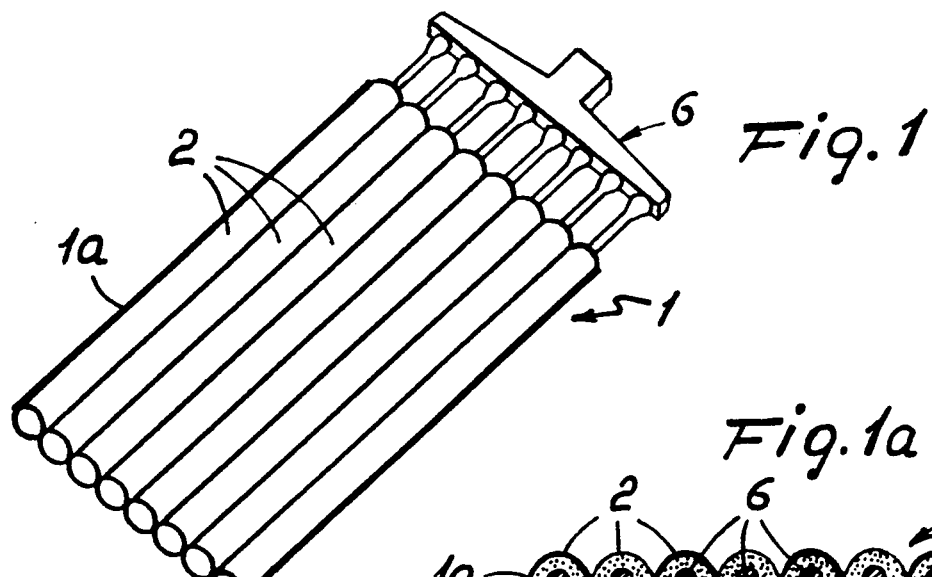
FIG. 1 shows a multitublar bag, from which a wire of lead alloy, a pin, shown schematically, protrudes in a partially extracted position.
Figure 1A:
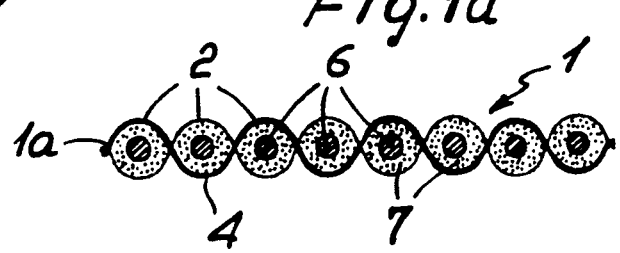
FIG. 1a shows a section of FIG. 1, made transversally to the pipes of the multitubular bag.

As shown in FIGS. 1 and 1a, there is provided a tubular positive plate that includes a wire support 6 made of lead alloy, a pin, housed in the center of active material 7 kept compacted around the pin 6 by means of pipes 2 made of proous material which is resistant to acids.

These pipes 2 are parallel with one another, have a main development direction and form on the whole a multitubular bag 1.

According to the invention the bag 1 is made-up by one-piece double fabric 1a, in two strata but made in one piece, supplied with internal hollow spaces forming the pipes 2.

As shown in FIG. 1a, the two strata of the double fabric 1a have a corrugated behaviour and are crossed and alternated with one another distributed in superior and inferior positions.

Figure 4:
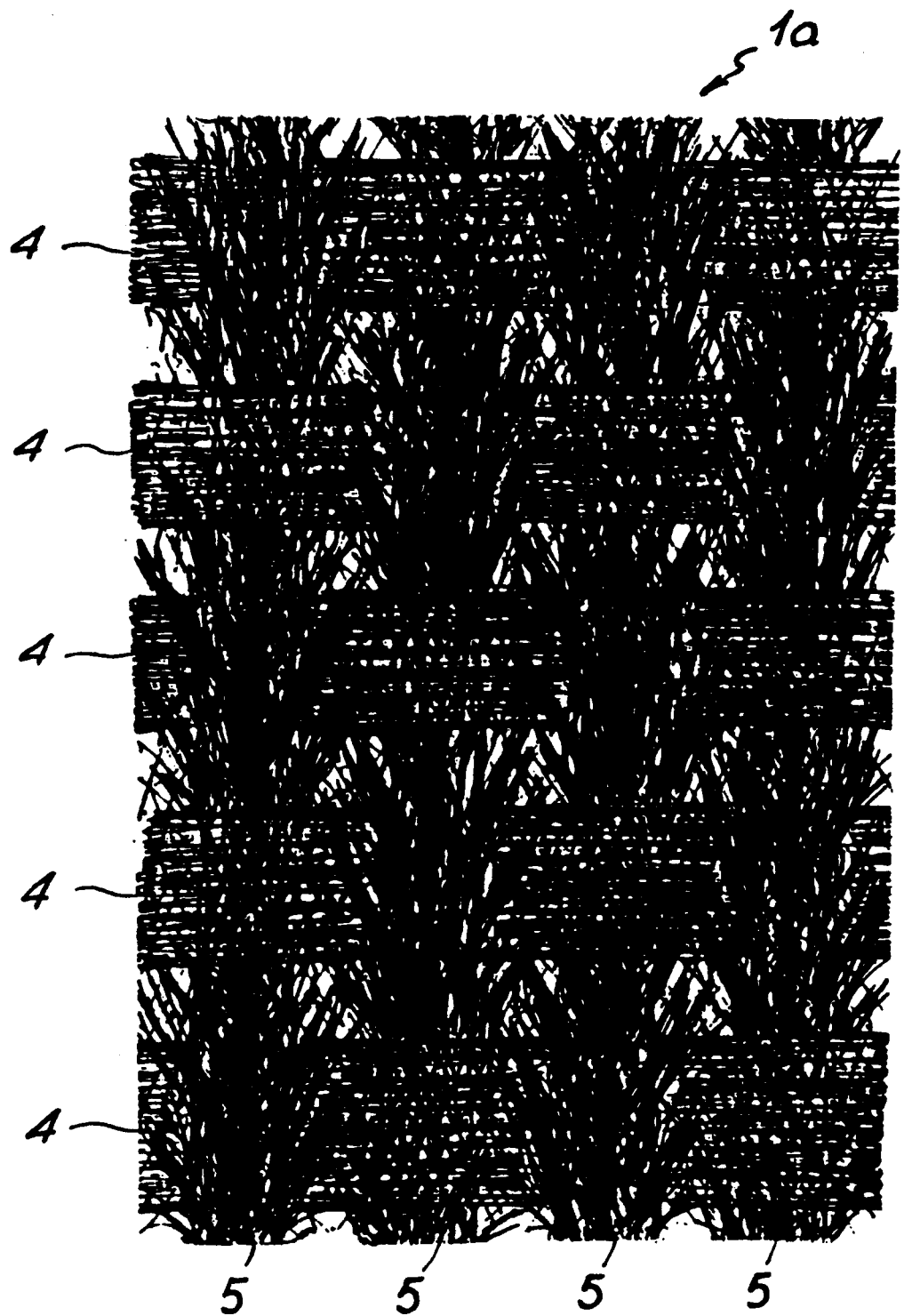
FIG. 4 shows, in a greatly enlarged scale, the structure of one-piece fabric forming the bag.

The structure of double fabric 1a is formed combining suitably high tenacity multifilament yarns having a very high tensile strength and a sufficient elasticity, indicated by 4 in FIG. 4, and yarns obtained starting from synthetic fiber staple having a high porosity and a high apparent volume, indicated by 5 in FIG. 4.

The resulting structure has the characteristics of excellent porosity of felts and the characteristics of excellent mechanical tensile strength of high tenacity yarns.

In detail it must be noticed that, as the mechanical stresses in each pipe 2 are caused by volume variations of the active material 7, for limiting these volume variations, the yarns 4, having very high mechanical characteristics and tensile strength and sufficient elasticity, are laid in direction transversal to themain development direction of said pipes 2.

Owing to this reason the yarns 4 are named in the following transversal yarns and are e.g. made of high tenacity polyester, e.g. with a breaking strength of 3.8 Kg, using a yarn with count of 550 denier tex.

In this manner the compression efforts, applied in radial direciton onto the walls of pipes 2 by the active material 7 that is spread, are contained by the transversal yarns 4 having an excellent mechanical tensile strength.

The high porosity of structure is obtained providing a yarn 5, names in the following longitudinal yarn, in a vertical direction, that is following the generatrixes of the cylindrical pipes 2, in the direction parallel to the main development direction of the same pipes 2.

This last yarn is obtained starting from a carded synthetic material staple for obtaining a high volume, formed by fibrils of the staple joined with one another according to traditional spinning systems.

The synthetic staple material can be again polyester, or polyester mixed with acrylic yarn, or polyester mixed with bead-acrylic yarn, having a breaking strength of only 1.8 Kg, using again a yarn with count of 550 denier tex.

Further it is possible to ensure that the carded part or longitudinal yarn 5, that shall have the function of filtering the active material 7 and that shall realize the high porosity of the structure, is predominant with respect to the transversal yarn 7 having high mechanical tensile strength, e.g. using the weaving in stich, twilled, panama forms, etc.

In fact the transversal yarns 4 can be inferior in number and have a high count, while the longitudinal yarns 5 can have a thin count and a high number.

The bag 1 is obtained as follows.

Using a normal weaving loom one first makes by a sole process, a one-piece double fabric 1a supplied with internal hollow spaces forming the pipes 2. The double fabric 1a is obtained in a soft condition.

The two strata of one-piece double fabric are intersected and alternated with one another. As to obtain a double tubular fabric formed by parallel pipes 2.

It is shown that the two strata of the one-piece double fabric 1a do not show connection yarns in points of reciprocal interseciton, but the same yarns are penetrated with one another, in the intersection zones, forming a one-piece fabric.

In this manner the obtained pipes 2 have a total strength against stresses that tend to detach the strata from one another, expanding the transversal section of pipes.

Further there are not present yarns or connection elements, in direction parallel to pipes 2, that are particularly resistent for preventing or hingering the homogeneous tension of the double fabric 1a in the development direction of pipes 2.

The whole fabric shall have the following structure: transversal high tenacity yarns 4 in direction transversal to pipes 2, longitudinal fabric 5 obtained by spinning of synthetic filament staple in direction longitudinal to pipes.

Figure 2:
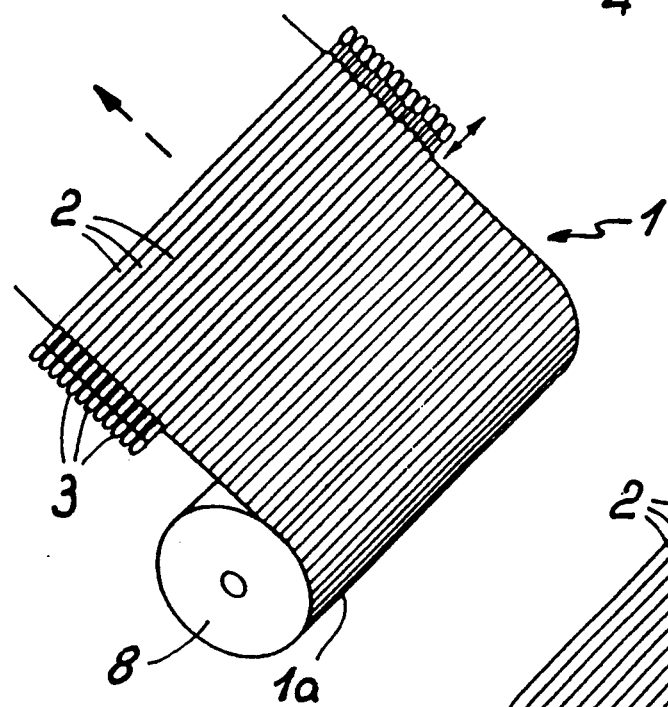
FIGS. 2 and 3 show a schematic view of two different forms of shaping for the pipes of the bag of FIG. 1, made in the execution process thereof, in conjunction with the thermoforming phase of the bag.
Figure 3:
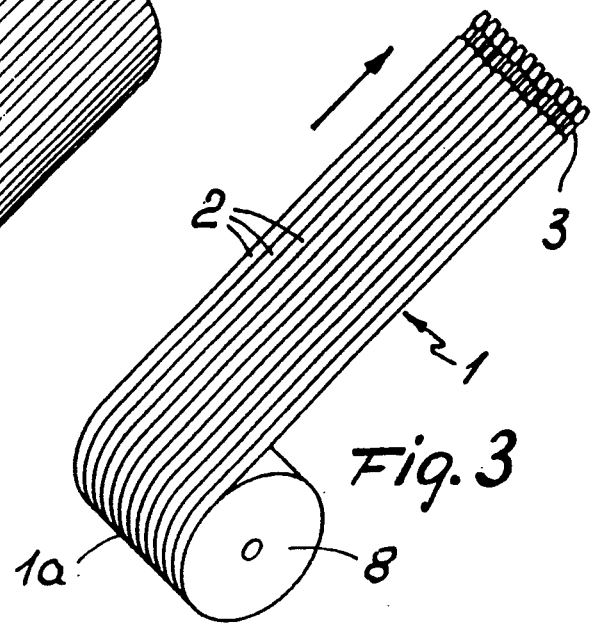

The transversal fabrics 4 (warp or woof type according to the matter that it is forseen the fulfilment of FIG. 2 or the fulfilment of FIG. 3, respectively), are intersected at regular intervals of about 20 millimeters.

This fabric is preferably treated with resins (e.g. phenolic or acrylic resins) and metallic spindles 3 are inserted thereinto and the real thermoforming is conducted within a temperature interval included between 120° and 200° C.

Next the metal spindles are extracted and a multitublar "carpet" ready for cutting and packing of a single bag 1 is obtained.

In detail the bag 1 is made as represented schematically in FIG. 2 or in FIG. 3, with pipes 2 being directed in direction transversal or parallel with respect to the development direction of a double fabric band 1a produced by the looms and shown in figures as collected in rolls 8.

In the case of FIG. 2 the spindles 3 are foreseen on one side of the bag 1 and protrude from sides or in opposite sides thereof. The spindles are inserted and then extracted intermittently into the pipes 2 from said sides, and at each cycle the bag 1 goes on by a section.

In the case of FIG. 3 the spindles 3 are fixed and the fabric is dragged in continuous manner onto the same metallic spindles 3, that are completely covered by pipes 2. The FIG. 3 shows the initial cycle phase, when the bag 1 has not yet covered completely the spindles 3.

These last spindles can remain in a fixed position also if they are immersed in the pipes 2 under the action of external stops, not represented, that prevent the traverse of the spindles 3 acting through the bag 1.

The stationary positioning of the spindles 3 can be made asier if said psindles have an S or C shape, or the like, that provides for resistance points to external stops.

Naturally in the case of fabric of FIG. 2 the warp is made of transversal continuous filament yarns 4 and the woof is made of carded longitudinal yarns 5 obtained from synthetic staple.

In the case of fabric of FIG. 3 the warp is made of carded longitudinal yarns 5 and the woof is made of transversal continuous filament yarns 4.

According to a feature of the invention, the bag 1 can be submitted to a fulfilment phase by which, notwithstanding a single fabric type is used as start product, e.g. very thick fabric, porosity levels of different value can be obtained. In fact it is foreseen an adjustment phase of the porosity of the bag 1 made by means of a high and calibrated stretching of the bag 1 in direciton parallel to the pipes 2, that is to say parallel to the development direction of longitudinal yarn 5 obtained starting from synthetic filament staple.

This phase is made before or during the thermoforming and the stabilization of the bag and this phase allows a shirnkage of longitudinal yarn 5, caused by the application of tensile force with a corresponding increase of the porosity.

According to the stretching level, the bag porosity is changed. It must be observed that the longitudinal yarn 5 is more capable of being deformed than the transversal yarn 4.

In this manner using a single base fabric and a single formation process of the bag it is possible to obtain bags with different physical characteristics, according to actual necessities. It is only necessary to change the stretching that the pipes 2 suffer during its formation.

The phenomenon of partial thinning of the longitudinal yarn 5 is obtained in an advantageous manner if the stretching is made while the double fabric 1a is inserted on the spindles 3. In fact in this case a change of section dimension of the pipes 2 is completely prevented.

In presence of fixed spindles 3, inserted slidingly and by force into the pipes 2, as shown in FIG. 3, the stretching action is summed to a forced sliding in a sole direction that tends to orient the longitudinal yarn fibers 5. In other words the sliding of spindles 3 tends to compact the fibrils of the longitudinal yarns 5.

It is important to observe that the stretching is made possible as the whole double fabric is a one-piece and homogeneous fabric and without connection yarns in conjunction with the edges of pipes 2. So the whole double fabric 2 has a structure similar to the one of FIG. 4 in each of its zones and it follows at least partially the stretchings that are made in the direction parallel to the longitudinal yarns 5 without causing forcings, stumblings or tearings.

I claim:

1. A multitublar bag for electrodes of electric batteries, having a plurality of pipes parallel with one another, comprising a one-piece double fabric forming said pipes in its inside, and including multifilament transversal yarns having high tenacity and high tensile strength, laid in direction transversal to said parallel pipes, and high porosity longitudinal yarns obtained from synthetic fiber staple, laid in direction parallel to said parallel pipes.

2. A multitubular bag according to claim 1, wherien winding active material surrounds a pin, wherein said active material is held between said pin and said one-piece double fabric in a position pressed against said pin by said transversal yarns, to assure the coherence of said active material and the constancy of the electric conductivity of said active material during the life time of said electric battery.

3. A process for manufacturing a multitubular bag for electrodes of electric batteries according to claim 1 comprising:
    inserting spindles in a direction parallel to the longitudinal yarns of a bag made from a one-piece double fabric forming pipes;
    adjusting the porosity of said bag by forced and calibrated stretching of the bag in a direction parallel to said longitudinal yarns;
    said adjusting being conducted at said spindles.

4. The process according to claim 5 wherein said spindles taper said longitudinal yarns by forced slipping during the adjustment of said bag.

* * * * *